April 9, 1935. W. A. SHEAFFER Re. 19,530

FOUNTAIN PEN

Original Filed March 12, 1934

Inventor:
Walter A. Sheaffer:
By Jones, Addington, Amos & Stribold
Attys.

Reissued Apr. 9, 1935

Re. 19,530

UNITED STATES PATENT OFFICE 19,530

FOUNTAIN PEN

Walter A. Sheaffer, Fort Madison, Iowa, assignor to W. A. Sheaffer Pen Company, Fort Madison, Iowa, a corporation of Delaware Original No. 1,983,682, dated December 11, 1934, Serial No. 715,063, March 12, 1934. Application for reissue January 22, 1935, Serial No. 2,976

8 Claims. (Cl. 120—47)

This invention relates to a fountain pen and has special reference to a fountain pen employing a plunger movable longitudinally in the writing fluid-containing barrel thereof to control the filling and evacuation of the barrel.

More particularly, this invention relates to that class of fountain pens in which ink or air contained within the barrel is displaced from one side to the other of a plunger therein during the stroke of the plunger away from the pen nib, and a partial vacuum is established in the barrel and the ink or air is expelled therefrom during the stroke of the plunger toward the pen nib, the barrel being substantially filled with ink drawn thereinto by the partial vacuum when the plunger reaches an enlarged bore at its limit of movement toward the pen nib during a single movement thereof.

In the present construction, a plunger is employed comprising preferably a normally flat disk provided between a backing member having a concave face and a clamping member, the clamping member holding the disk in a conforming engagement with the concave surface. In this manner of construction, when the plunger is moved longitudinally in one direction, the flow of ink is directed around the plunger while the disk is in a normal condition to direct such passage with a minimum danger of obstructing the passage of the ink of the barrel to the feed section. Further, the disk is provided with a flat peripheral edge which, when deformed into an arcuate cross section by being clamped between the concave surface of the backing plate and the clamping member, presents a sharp edge for engagement with the wall of the barrel in either direction of the travel of the plunger to minimize the frictional engagement therebetween and permit an easy movement of the plunger rod, although providing for at least the same efficient substantially airtight engagement as may be had in any other condition.

The arcuate cross section of the plunger disk further allows for variances in the diameter of the bore of the barrel of the pen due to any contraction and expansion of the material of which the barrel is made. Ordinarily, the barrel is made of a plastic material which is subject to temperature changes and the curvature thus obtained in the disk permits of a desired frictional engagement therebetween even though the diameter of the bore of the barrel may vary within the expansible and contractible limits of the material.

The plunger disk is of a yielding resilient material preferably of rubber which is substantially unaffected by the chemicals of the writing fluid. In clamping the rubber disk between the backing plate and clamping member, the compressibility of the rubber can not be readily controlled and the diameter of the disk itself may vary aside from the variances already described in connection with the expansion and contraction of the barrel. Thus, the provision of an arcuate cross section of the disk permits of variances in the diameter of the disk caused by the compressibility of the rubber and such variances as are caused by the expansion and contraction of the material of the barrel itself.

One of the objects of this invention is to provide a fountain pen of the character noted above in which a normally flat disk is held between a backing member and clamping member, the clamping member holding the disk in conformity to a concave surface of the backing member to allow for variances in the diameter of the disk and in the bore of the barrel of the pen.

Another object of this invention is to provide a plunger for a fountain pen of the above noted type in which a normally flat disk having a flat peripheral edge in held in an arcuate cross section to present a sharp edge for engagement with the bore of the barrel in either direction of travel of the plunger to minimize the frictional engagement therebetween and permit an easy movement of the plunger rod.

A further object of this invention is to provide a fountain pen of the above noted type which is simple in construction and operation, comparatively inexpensive to manufacture and durable.

Other objects and advantages will hereinafter be more particularly pointed out and for a more complete understanding of the characteristic features of this invention, reference may now be had to the following description when taken together with the accompanying drawing, in which latter:

Figure 1:
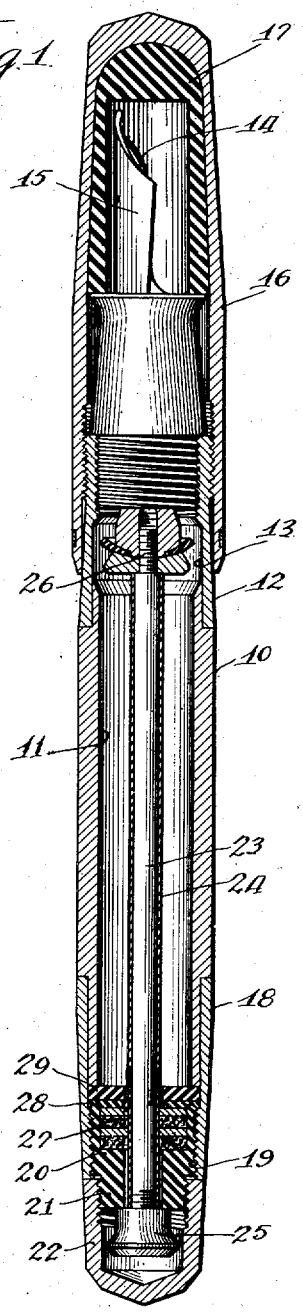
Figure 1 is a longitudinal sectional view of a fountain pen embodying this invention with the plunger shown at the limit of movement thereof toward the pen nib.

Referring now more particularly to the drawing, this invention is shown as being embodied in an open-ended pen barrel 10 preferably of a plastic composition material having a hollow cylindrical interior or bore 11. A peripheral portion of the barrel 10 is reduced at one end to engage the bore of a pen section 12, that portion of the bore extending beyond the end of the barrel 10 forming an enlargement 13. The pen section 12 is provided in the usual manner with a feed bar 14 having the usual ink feeding passages for conducting ink to a pen nib 15, the feed bar 14 communicating with the enlargement 13 of the feed section. The exposed ink feeding mechanism and pen nib may be suitably enclosed with a cap 16 having threaded engagement with the pen section and having an inner hard rubber sealing member 17 for engagement with the end of the pen section.

A peripheral portion of the other end of the pen barrel 10 is reduced to engage the bore of a sleeve 18 formed preferably of a plastic composition material, the extending portion of the sleeve having internal threads 19 for engaging the external threads of a barrel plug 20. The barrel plug 20, in turn, has a reduced threaded extension 21 for receiving an internally threaded cup-shaped cap 22.

A plunger rod 23 preferably of Monel metal is provided with a sleeve 24 substantially throughout its length, one end of the rod having a preferably brass plunger button 25 to be grasped by the fingers in manipulating the rod and the other end being provided with a reduced threaded extension 26. The sleeve 24 covering the plunger rod 23 is formed preferably of rubber since such material is substantially not affected by the chemicals of the writing fluid, the sleeve and rod being supported by the plug 20 and the sleeve having slidable engagement in an aperture thereof. The cap 22 encloses the plug 25 when in an operative writing condition, the cap being readily removable when it is desired to operate the plunger rod.

In order to provide for a substantially air-tight joint around the plunger rod as it is moved longitudinally of the barrel of the fountain pen, the barrel plug 20 is provided with an internal aperture 27 of substantial depth for receiving a series of apertured disks, the outer peripheries of the disks fitting snugly in the aperture 27 and the disks being apertured to snugly receive the hard rubber sleeve 24 of the plunger rod 23. It has been found in order to provide a substantially air-tight joint and yet permit the plunger to slide smoothly, that a plurality of alternate rubber and felt disks be employed, the felt disks providing a desired amount of give on each side of the rubber disks. The provision of alternate rubber and felt disks has been found to be infinitely superior to the usual solid packing for the purpose of the present construction, that is, to provide ease of operation and yet obtain efficient and desired results.

The plug 20 is threaded into the sleeve 18 against a soft rubber gasket 28, which latter is disposed adjacent a disk 29 preferably of a plastice or other comparatively hard material such as that of the barrel itself, the latter disk abutting against the end of the barrel within the sleeve. Thus, a substantially air-tight joint is had to prevent the escape or entrance of air through the threads of the barrel plug or between the plunger rod and the disks.

A backing plate 30 is provided with a central aperture for receiving the reduced threaded end portion 26 of the plunger rod 23, one face of the plate abutting against a shoulder formed by the reduced end portion 26 and the other face being concave for engaging one side of a disk 31. The disk 31 is provided with a central aperture for receiving a reduced extension 32 of a clamping member 33, the latter having an internally threaded aperture to engage the threaded extension 26 for holding the disk 31 in conforming engagement with the concave surface of the backing plate 30. The backing plate 30 and the clamping member 33 are formed preferably of hard rubber and the disk 31 is formed of a yielding resilient material preferably of soft rubber.

Figure 2:
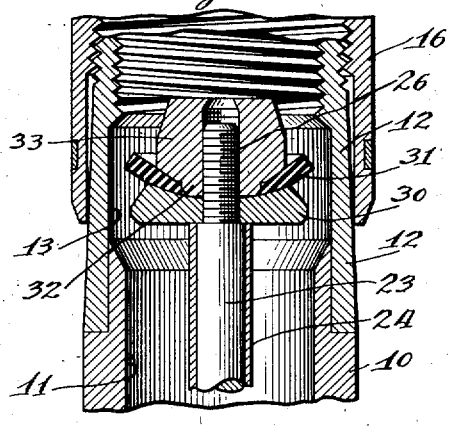
Fig. 2 is an enlarged fragmental sectional view of a portion of the pen barrel with the plunger in the position therein shown in Figure 1.
Figure 3:
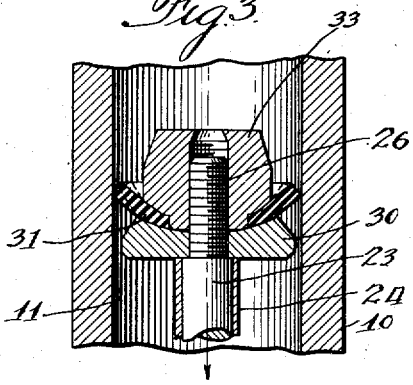
Fig. 3 is a view similar to Fig. 2, showing a changed position of the plunger as the plunger disk is moved in a direction away from the pen nib.
Figure 4:
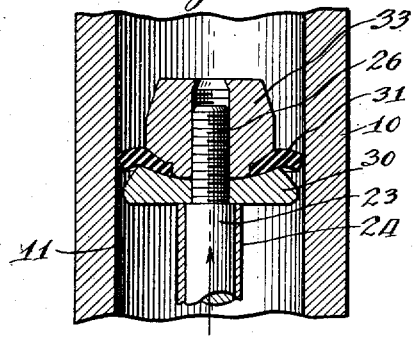
Fig. 4 is a view similar to Fig. 3, showing the condition of the plunger disk during the movement of the plunger rod in a direction toward the pen nib.

The plunger disk 31 is normally flat and has a peripheral side formed at substantially right angles to the flat surfaces thereof. The backing plate, clamping member and interposed disk are of such diameters that a movement of the plunger in either direction longitudinally of the bore 11 of the barrel 10 will cause a rearward inclination of the disk 31 relative to the direction of movement thereof and will present the sharp edges between the flat faces and side of the disk alternately for engagement with the bore, as is shown more particularly in Figs. 3 and 4. In Fig. 3, the movement of the plunger is indicated by the arrow and a normal position of the plunger is shown in full lines, the sharp edge of the disk engaging the bore 11 of the barrel 10. In dotted lines, a spaced relation of the disk of the bore of the barrel is shown to indicate the relation of the disk in the barrel as ink and air are displaced from one side to the other of the plunger during the stroke of the plunger away from the pen nib or in the direction of the arrow. In Fig. 4, the other sharp edge of the disk is shown as being presented to the bore 11 of the barrel whereby a partial vacuum is being created behind the plunger and the contents of the barrel in front of the plunger is being evacuated as the plunger is moved longitudinally in the barrel until it reaches its limit of movement as shown in Fig. 2, where the filling of the barrel is accomplished by means of the breaking of the vacuum created behind the plunger.

In practical use and in assuming that there is a small quantity of ink within the bore 11 of the barrel 10 and it is desired to refill, the operator first removes the cap 22 and grasps the plunger button 25 to move the same in a direction away from the pen nib. During this movement, the air and ink contained within the barrel will press upon the plunger disk 31 sufficiently to cause it to assume the position shown in dotted lines in Fig. 3 and air and ink may pass around the periphery of the disk 31 and occupy a position in the barrel on the opposite side of the plunger.

As soon as the plunger disk has reached its limit of movement in a direction away from the pen, the disk, because of its resiliency, will assume a position with one of the sharp edges between a flat peripheral side and a flat face of the disk held firmly in engagement with the bore of the barrel. When the plunger is moved in a direction toward the pen nib as shown in Fig. 4, the other sharp edge between the flat peripheral side and the other flat face of the disk will be urged tightly against the bore of the barrel so that air or ink will be expelled from the barrel in front of the plunger and a maximum degree of vacuum will be created within the barrel at the rear of the plunger.

When the plunger disk 31 reaches the enlarged bore 13 of the pen section 12 and assuming that the pen nib is inserted in a supply of ink, the ink will be drawn into the barrel 10 through the feed section 14 to approximately fill the barrel. Thus, the complete operation of expelling the contents of the barrel and the filling of the barrel with ink is done with a single stroke of the plunger in one direction.

The diameter of the backing plate 30 and the clamping member 33 is smaller than the diameter of the disk 31, the diameter of the clamping member being, in turn, smaller than the backing plate. It is to be noted that a comparatively small peripheral portion of the disk is subjected to flexing.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a disk formed of yielding resilient material, a backing plate on said rod having a concave face for engaging one side of said disk, and a clamping member of substantially smaller diameter than said disk for holding said disk in conforming engagement with said concave face and for permitting the periphery of said disk to stand spaced apart from the bore when the plunger rod is moved away from the writing point end, said backing plate being substantially rigid and extending over a substantial portion of said disk to provide a fulcrum for the flexure of said disk at a peripheral portion thereof when said rod is moved in a direction toward the writing point end to effect a maximum ease of movement while maintaining a substantially air-tight engagement of said disk with the bore of said barrel.

2. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a normally flat disk formed of yielding resilient material, a backing plate on said rod having a concave face for engaging one side of said disk, and a clamping member of substantially smaller diameter than said disk for holding said disk in conforming engagement with said concave face and for permitting the periphery of said disk to stand spaced apart from the bore when the plunger rod is moved away from the writing point end, said disk having a peripheral side formed at substantially right angles to the flat surfaces of said disk and said backing plate being substantially rigid and extending over a substantial portion of said disk to provide flexure of said disk at a peripheral portion thereat to present an edge of said disk between the face and side for engagement with the bore of said barrel when said rod is moved in a direction toward the writing point end to effect a maximum ease of movement of the plunger while maintaining a substantially air-tight engagement with the bore of the barrel.

3. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a soft rubber disk of greater diameter than the bore of said barrel, a backing plate on said rod formed of hard rubber and having a concave face for engaging one side of said disk, and a hard rubber clamping member of substantially smaller diameter than said disk for holding said disk in conforming engagement with said concave face and for permitting the periphery of said disk to stand spaced apart from the bore when the plunger rod is moved away from the writing point end, the concave face of said backing plate terminating short of the periphery of said disk and presenting thereat a fulcrum for the flexure of said disk when said rod is moved in a direction toward the writing point end to effect a maximum ease of movement while maintaining a substantially air-tight engagement of said disk with said bore.

4. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a soft rubber disk of greater diameter than the bore of said barrel and having a central aperture, a backing plate on said rod formed of hard rubber and having a concave face for engaging one side of said disk, and a hard rubber clamping member of substantially smaller diameter than said disk for holding said disk in conforming engagement with said concave face and for permitting the periphery of said disk to stand spaced apart from the bore when the plunger rod is moved away from the writing point end, said clamping member having a reduced extension of substantially the thickness of said disk for passing through the aperture thereof and abutting against said backing plate to prevent a substantial compression of said disk, the concave face of said backing plate terminating short of the periphery of said disk and presenting thereat a fulcrum for the flexure of said disk when said rod is moved in a direction toward the writing point end to effect a maximum ease of movement while maintaining a substantially air-tight engagement of said disk with said bore.

5. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a disk of yielding resilient material, a backing plate on said rod having a face for engaging one side of said disk, a separate clamping member of substantially smaller diameter than said disk for holding said disk in conforming engagement with said face of said backing plate and for permitting the periphery of said disk to stand spaced apart from the bore when the plunger rod is moved away from the writing point end, said backing plate being substantially rigid and extending over a substantial portion of said side of said disk to support the same, said backing plate being of such a diameter as to present a peripheral fulcrum for the flexure of the outer portion of said disk on a substantial radius when said rod is moved in a direction toward the writing point end to effect a maximum ease of movement while maintaining a substantially air-tight engagement with the bore of the barrel.

6. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a disk of yielding resilient material, a backing plate on said rod having a face for engaging and supporting one side of said disk, and a clamping member of substantially smaller diameter than said disk for holding said disk in conforming engagement with said face of said backing plate and for permitting the periphery of said disk to stand spaced apart from the bore when the plunger rod is moved away from the writing point end, said disk having a peripheral side formed at substantially right angles to the flat surfaces of said disk and said backing plate being substantially rigid to extend over a substantial portion of said side of said disk and permitting a flexure of said disk at the peripheral portion thereof to present an edge of said disk between a face and side for engagement with the bore of said barrel when said rod is moved in a direction toward the writing point end to effect a maximum ease of movement while maintaining a substantially air-tight engagement with the bore of the barrel.

7. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and comprising a yielding resilient disk having a central aperture, a backing plate on said rod having a face for engaging and supporting one side of said disk, and a clamping member of substantially smaller diameter than said disk for holding said disk in conforming engagement with said face of said backing plate and for permitting the periphery of said disk to stand spaced apart from the bore when the plunger rod is moved away from the writing point end, said clamping member being substantially rigid and having a reduced extension of substantially the thickness of said disk for passing through the aperture thereof and abutting against the backing plate to prevent a substantial compression of said disk, the said face of said backing plate terminating short of the periphery of said disk and presenting thereat a fulcrum for the flexure of the outer portion of said disk on a substantial radius when said rod is moved in a direction toward the writing point end to effect a maximum ease of movement while maintaining a substantially air-tight engagement with the bore of the barrel.

8. A fountain pen of the character described including a barrel in which the bore at the writing point end thereof is provided with means to break the vacuum created behind a plunger in its movement thereto for filling the barrel with a writing fluid, the plunger being mounted on a rod for reciprocation in the barrel and having a reduced connection at one end providing a shoulder, a plunger mounted on and secured to said connection, said plunger comprising a backing plate fitting over said extension and abutting said shoulder, a yielding resilient disk fitting against one face of said backing plate and having a central aperture larger than said extension, and a clamping member engaging said connection on the other side of said disk from said backing plate to clamp said disk against the face of said backing plate, said clamping member having a reduced extension passing through and fitting the aperture in said disk and being of a length to engage said backing plate when tightened thereby to prevent undue clamping pressure on said disk, the peripheral edge of said disk engaging the wall of the bore of said barrel, the clamping member being of substantially smaller diameter than said disk for holding said disk in conforming engagement with said face of said backing plate and for permitting the periphery of said disk to stand spaced apart from the bore when the plunger rod is moved away from the writing point end, said backing plate being substantially rigid and extending over a substantial portion of said side of said disk to support the same, said backing plate being of such a diameter as to present a peripheral fulcrum for the flexure of the outer portion of said disk on a substantial radius when said rod is moved in a direction toward the writing point end to effect a maximum ease of movement while maintaining a substantially air-tight engagement with the bore of the barrel.

W. A. SHEAFFER.